B. F. GLADDING.
Rake
No. 63,154. Patented Mar. 26, 1867.
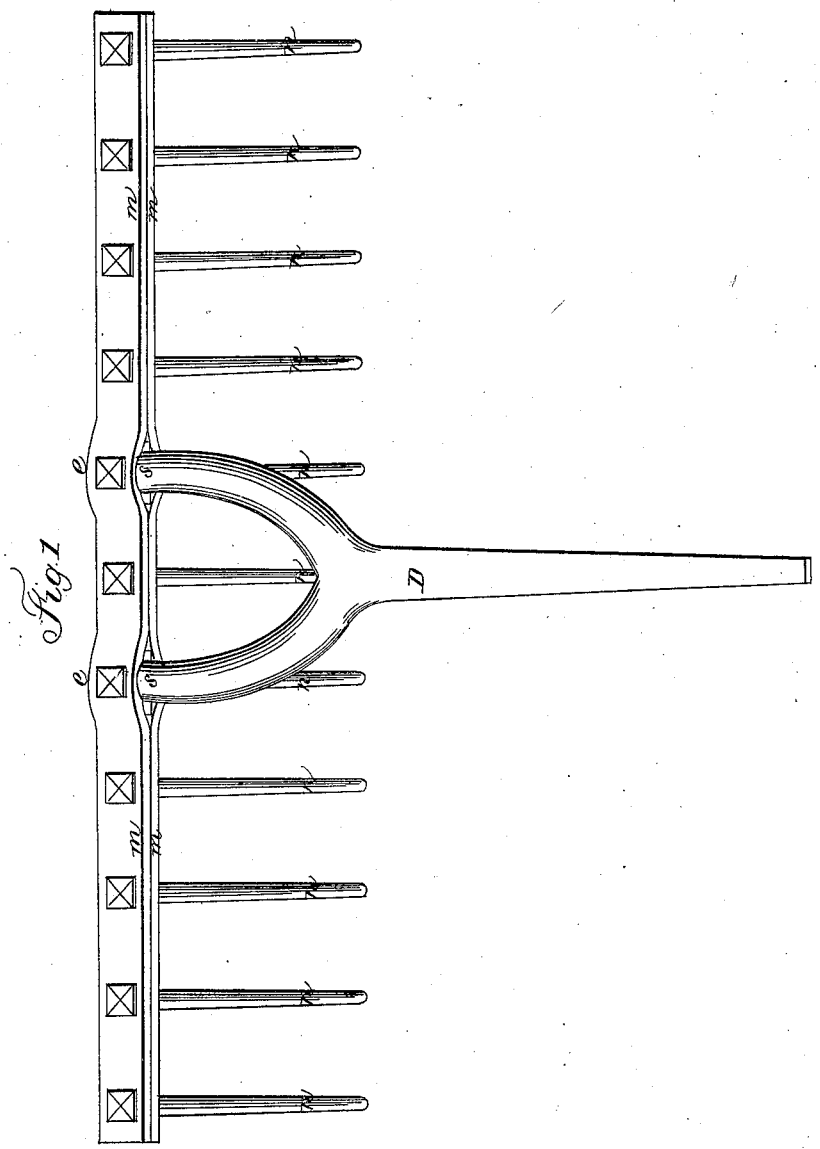

United States Patent Office.

BENJAMIN F. GLADDING, OF PROVIDENCE, RHODE ISLAND

Letters Patent No. 63,154, dated March 26, 1867; antedated March 10, 1867.

IMPROVEMENT IN RAKES.

*The Schedule referred to in these Letters Patent and making part of the same.*

TO ALL WHOM IT MAY CONCERN:

Be it known that I, BENJAMIN F. GLADDING, of the city and county of Providence, and State of Rhode Island, have invented a new and useful Improvement in Rakes; and I do hereby declare that the following is a full, clear, and exact description of the same, reference being had to the accompanying drawings, making part of this specification, in which—

Figure 1 represents a perspective view of my improved rake.

My invention consists in constructing the head or tooth-bar of the rake double or of two corresponding strips of metal, through both of which the ends of the teeth are riveted or otherwise secured to insure greater stiffness; also in combining with a rake-head, substantially as described, a forked shank, the forked ends of which are inserted between the two parts of the head and secured by the fastening of two of the teeth.

In the drawing, $m$ $m$ are the two strips of the rake-head of corresponding form and size. They are placed together, and the holes for the reception of the teeth punched through both at once, after which they are heated and bent at $e$ $e$ in the manner shown for the reception of the forked ends $S$ $S$ of the shank D. This shank may be forged in the form shown, or it may be punched cold from the metal and afterwards wrought into form by heating and hammering in the usual way, or it may be swaged into form at a single blow under the hammer of a drop-press. When formed, the forked ends are pierced with suitable holes for the ends of the teeth to pass through, after which the teeth $n$ are inserted and riveted on the upper side of the head, as shown; the teeth being punched cold from the metal, with a neck which passes through the head $m$ to be riveted, and a shoulder which is drawn up against the under side of the head so as to fasten the two parts $m$ together. As described, an exceedingly neat and substantial implement for the purpose may be constructed at a comparatively small cost.

What I claim, and desire to secure by Letters Patent, is—

Constructing the rake-head double or of two pieces of metal secured together, substantially in the manner described for the purpose specified.

I also claim the combination of a rake-head constructed as described, and a forked shank, the two parts being united substantially as described.

BENJAMIN F. GLADDING.

Witnesses:
   ISAAC A. BROWNELL,
   FRANCIS COLWELL, Jr.